R. L. B. STRUBLE.
DIRECTION INDICATOR.
APPLICATION FILED JUNE 26, 1917.

1,318,816.

Patented Oct. 14, 1919.

R. L. B. Struble
Inventor

By Geo. P. Kimmel
Attorney

UNITED STATES PATENT OFFICE.

ROSE L. B. STRUBLE, OF PENN YAN, NEW YORK.

DIRECTION-INDICATOR.

1,318,816.  Specification of Letters Patent.  Patented Oct. 14, 1919.

Application filed June 26, 1917. Serial No. 176,999.

*To all whom it may concern:*

Be it known that I, ROSE L. B. STRUBLE, a citizen of the United States, and resident of Penn Yan, in the county of Yates and State of New York, have invented certain new and useful Improvements in Direction-Indicators, of which the following is a specification.

This invention relates to improvements in direction indicators; the dominant object of the invention being to provide a direction indicator especially designed for use on motor driven vehicles whereby the operator can distinctly signal to following and oncoming vehicles or pedestrians the course his particular vehicle is to take previous to the steering of the same thereinto.

Another and equally important object of the invention is to provide the signal with means for releasably maintaining the same in a signaling position when operated in order that the operator can use both hands in the steering and controlling of the vehicle.

Other objects will be in part obvious and in part pointed out hereinafter.

Other and further improvements and novel details in the construction and arrangement of parts will be appreciated from the description to follow, which, for a clear understanding of the invention should be considered in connection with the accompanying drawings forming a part thereof and wherein the preferred embodiment of the invention is shown for the purpose of illustration.

In the drawings.

Similar characters of reference are employed in all of the above described views to indicate corresponding parts.

Figure 1:
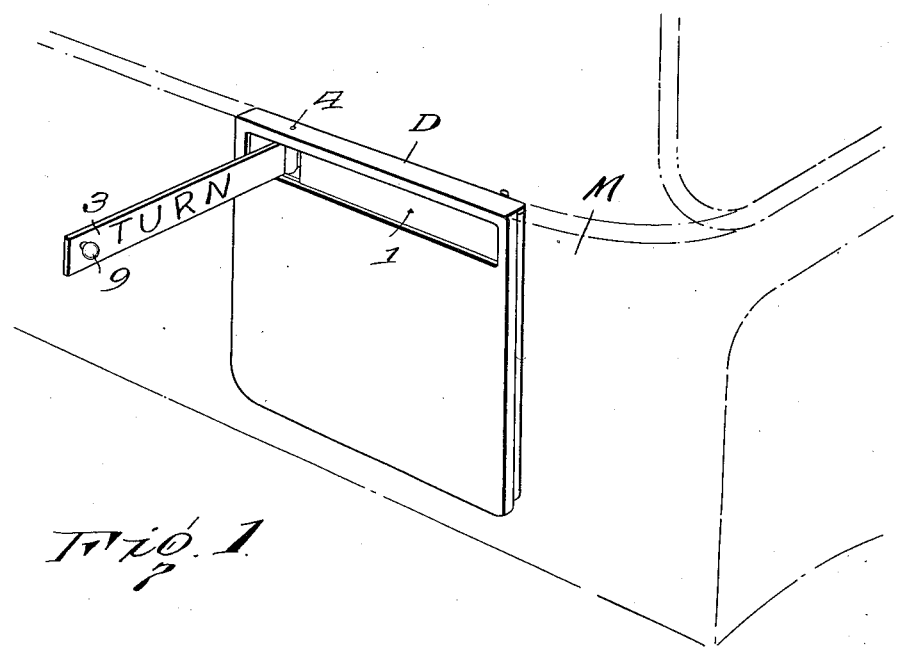
Figure 1 is a perspective of an automobile fore door with my improved direction indicator arranged thereon.
Figure 2:
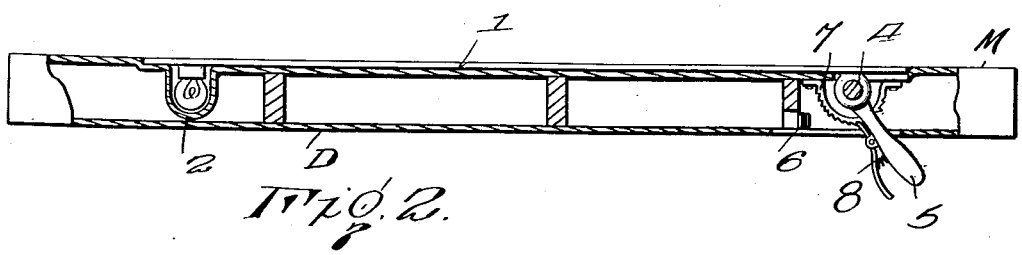
Fig. 2 is a horizontal section through the same.
Figure 3:
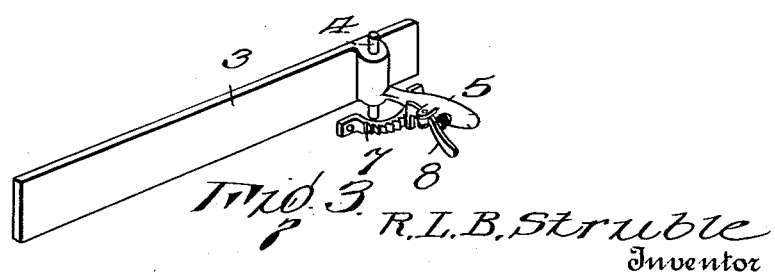
Fig. 3 is a detail in perspective of the direction indicator.

Having more particular reference to the drawings, M designates the body of a motor driven vehicle which is shown in fragment and is provided with a hingedly mounted fore door D. The door D is provided with a casing of sheet metal, the upper portion of which is formed with a horizontally disposed pocket or depression 1, one end of which is deepened as at 2 for a purpose which will be subsequently obvious.

Lying within the horizontal depression 1 and flush with the outer surface of the door D is a signaling arm 3, this arm being pivotally mounted adjacent one extremity thereof as at 4, the bearing pin having its opposite ends journaled in bearings formed in the upper and lower portions of the door adjacent said horizontal depression. A handle 5 is secured or formed integral with the pintle or sleeve arranged about the bearing pin 5 and extends through a slot formed upon the inner side of the door to a position whereat the same may be conveniently grasped by the vehicle operator. To releasably maintain the signaling arm 3 in its operative or signaling position, a segmental ratchet 7 is secured to the inner side of the door D and is engaged by a pivotal spring pressed pawl 8 carried on the handle 5.

Upon one or both faces of the signaling arm 3 indicating matter such as the word "turn" or the like is arranged. Thus, operators in following and oncoming vehicles or pedestrians will be informed of the direction or course in which the vehicle is to travel previous to the steering of the same thereinto. Upon the outer or free end of the signaling arm 3 an electric incandescent lamp 9 is arranged and is engaged by suitable electrical conductors which extend into engagement with a suitable source of power, not shown. In this way, the indicating matter carrying faces of the signaling arm will be illuminated in order that the signal can be effectively operated in darkness. It is to be noted in this connection, that the incandescent lamp 9, if desired, may be so arranged as to cast its light rays upon both of the indicating matter carrying faces of the signaling arm, such as conditions or preference may dictate.

In operation, when it is desired to swing the signaling arm outwardly to a position at substantially right angles to the door D in order that the same will be displayed, the operator grasps the handle 5 and upon depression of the spring pressed pivotal pawl 8 moves the same forwardly. With the signaling arm 3 properly positioned, the handle 5 may be released by the operator, the pivotal pawl due to its engagement with the segmental ratchet 7 serving as means for releasably holding the said signaling arm in its operative or signaling position. When in inoperative position, it will be noted that the incandescent lamp 9, when the same is carried upon one side of the signaling arm 3 lies in the deepened portion 2 of the depression 1.

Manifestly, the construction shown is capable of considerable modification, and such modification as is within the scope of my claims, I consider within the spirit of my invention.

I claim:

1. The combination with a supporting structure having an inner wall provided with an opening and an outer wall positioned in spaced relation to the inner wall and provided with a depression forming a seat having one end portion apertured to provide an opening in operative relation to the opening formed in said inner wall, of a signal plate positioned in the seat with its outer face substantially flush with the outer face of the outer wall, a shoulder extending from the signal plate through the opening at one end of the seat into the space between the inner and outer walls and having pivot pins extending from its upper and lower end and engaging said supporting structure to pivotally mount the signal plate, an actuating handle extending from the shoulder through the opening in the inner wall, a rack, and a latch carried by the actuating handle for engaging the rack to releasably hold the signal plate in an adjusted position.

2. The combination with a supporting structure having an inner wall provided with an aperture and an outer wall positioned in spaced relation to the inner wall, the outer wall being recessed to provide the seat having one end portion apertured to provide an opening in operative relation to an aperture formed in the inner wall, a signal arm positioned in the seat, a shoulder extending from the signal arm through the aperture of the outer wall into the space between the inner and outer wall, means connecting the shoulder with the supporting structure to pivotally mount the signal arm, and an actuating handle extending from the shoulder through the cut out in the inner wall for imparting movement to the signal arm.

3. The combination with a vehicle door having a wall provided with a sunken seat and with an aperture adjacent one end of the seat, of a signal plate positioned in the seat, means to pivotally mount the signal plate extending through the aperture, and means extending from said last mentioned means whereby the signal may be swung to an adjusted position from within the vehicle.

In testimony whereof I affix my signature hereto.

ROSE L. B. STRUBLE.